United States Patent
Kröckert et al.

[11] Patent Number: 5,185,141
[45] Date of Patent: Feb. 9, 1993

[54] PROCESS FOR THE PRODUCTION OF IRON OXIDE YELLOW PIGMENTS

[75] Inventors: Bernd Kröckert, Wesel; Helmut Printzen, Krefeld; Hans-Peter Biermann, Krefeld; Hans-Ulrich Höfs, Krefeld, all of Fed. Rep. of Germany

[73] Assignee: Bayer Aktiengesellschaft, Leverkusen, Fed. Rep. of Germany

[21] Appl. No.: 484,525

[22] Filed: Feb. 26, 1990

[30] Foreign Application Priority Data

Mar. 11, 1989 [DE] Fed. Rep. of Germany ....... 3907917

[51] Int. Cl.$^5$ .............................................. C01G 45/02
[52] U.S. Cl. ...................................... 423/632; 423/633; 106/456
[58] Field of Search .................... 106/456, 419, 431; 423/632, 633; 75/365

[56] References Cited

U.S. PATENT DOCUMENTS

| | | | |
|---|---|---|---|
| 1,327,061 | 1/1920 | Penniman et al. | 423/633 |
| 1,368,748 | 2/1921 | Penniman et al. | 423/633 |
| 2,111,726 | 7/1932 | Plews | 423/633 |
| 4,060,596 | 11/1977 | Nakamura | 423/633 |
| 4,112,063 | 9/1978 | Buxbaum | 423/633 |
| 4,620,879 | 11/1986 | Burow et al. | 106/456 |
| 4,698,100 | 10/1987 | Burow et al. | 106/456 |
| 4,806,335 | 2/1989 | Saito et al. | 423/632 |

FOREIGN PATENT DOCUMENTS 0030790 6/1981 European Pat. Off. ............ 106/456

*Primary Examiner*—Mark L. Bell
*Assistant Examiner*—Paul Marcantoni
*Attorney, Agent, or Firm*—Connolly & Hutz

[57] ABSTRACT

Low-silking iron oxide yellow pigments having improved color qualities are produced by a novel method which utilizes both precipitation process and the Penniman process. Pigments are nucleated and grown by precipitation to achieve multiplication factor of 2.5 to 7 and additional pigment growth is carried out by the Penniman process.

7 Claims, 1 Drawing Sheet

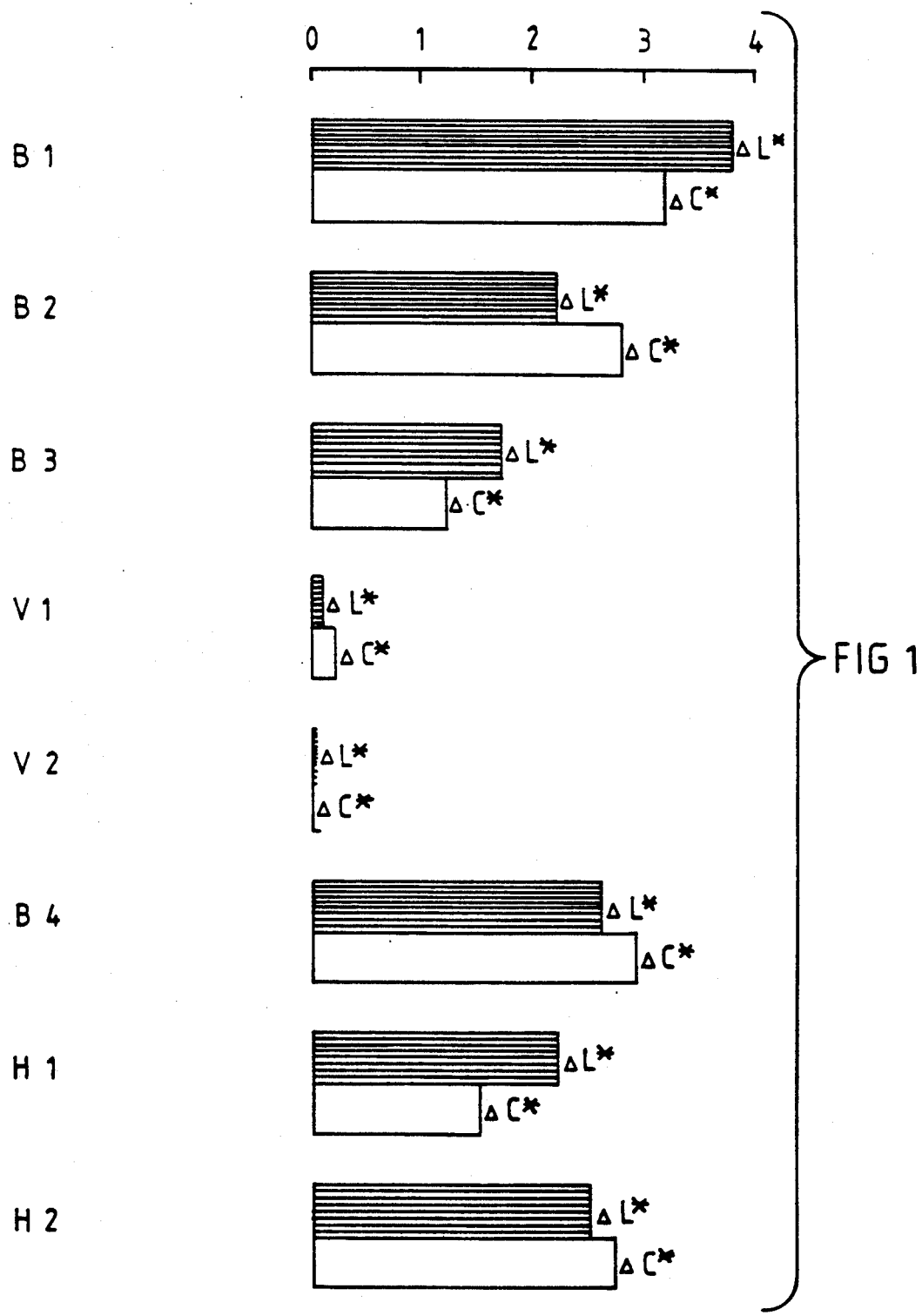

PROCESS FOR THE PRODUCTION OF IRON OXIDE YELLOW PIGMENTS

This invention relates to a process for the production of low-silking iron oxide yellow pigments in which the nucleation of acicular α-FeOOH yellow pigments is carried out in the presence of compounds of the elements B, Al, Ga, Si, Ge, Sn or Pb in quantities of 0.05 to 10% by weight, expressed as 3- or 4-valent oxides and based on the α-FeOOH precipitated during nucleation and an iron oxide yellow pigment is grown on the yellow nucleus.

Non-silking iron oxide yellow pigments are known from DE-A 3 326 632. By production of the nucleus with the necessary quantity of foreign ions, it is possible to obtain intergrowth of the normally acicular goethite particles. Multiplication of the nucleus initially produced takes place at elevated temperature. According to DE-A 3 716 300, particularly good pigments are obtained if a pH-stage procedure is adopted in the precipitation process during the first multiplication factors (MF). The MF is a dimensionless value which describes the multiplication of the quantity of FeOOH used as nucleus.

In the precipitation process, alkali is added to iron(II) salt solutions under the effect of gaseous oxidizing agents until an acidic pH range is maintained.

Basically, the pigment may be built up by the precipitation process, the Penniman process and the aniline process (Ullmanns Encyklopädie der technischen Chemie, 4th Edition, 1979, page 602). Hitherto, however, it has only been possible by the precipitation process to produce light and saturated pigments which, in coloristic terms, correspond to the commercial products of Bayer AG Bayferrox ® AC 5075 or 920.

In the Penniman process, iron(II) ions are oxidized to iron(III) ions by exposure to atmospheric oxygen. The iron(III) ions hydrolyze on the surface of the nucleus, as a result of which the pigment is built up and protons are released. The protons dissolve the iron initially introduced to form iron sulfate. Since the FeSO$_4$ only acts as a catalyst in the Penniman process, this process should always be used for pigment production because, in contrast to the precipitation process, an equimolar quantity of sodium sulfate accumulates in the Penniman process, so that the salt load can be reduced.

The following relation may be taken as a measure of the reduction in the salt load:

$$\frac{\text{mol FeSO}_4 - \text{mol FeOOH}}{\text{mol FeSO}_4} = a \text{ or } b.$$

a. zero in the precipitation process
b. less than zero in the Penniman-Zoph process in the above relation:
mol FeSO$_4$ = number of mols FeSO$_4$ per liter which are added to the suspension after nucleation,
mol FeOOH = number of mols FeOOH per liter which are formed after nucleation.

This means that, in the precipitation process, the reduction in the salt load is always zero. For typical process conditions in the Penniman-Zoph process, as described in US-A 1,327,061 and US-A 1,368,748, the figure is less than zero and thus signifies a reduction in the quantity of salt accumulating.

To obtain a further reduction in the salt load, spherolithic pigments should be produced by the Penniman process. Where the nuclei described in DE-A 3 326 632 are selected for pigment growth, it has not hitherto been possible to produce pigments of adequate lightness and saturation (Comparison Example 2 and FIG. 1).

Now, the problem addressed by the present invention is to provide a process which does not have any of the described disadvantages.

This problem can surprisingly be solved by using non-silking nuclei produced by the precipitation process up to multiplication factors (MF) of 7 as starting material in the Penniman-Zoph process.

Accordingly, the present invention relates to a process for the production of low silking iron oxide yellow pigments, in which the nucleation of acicular α-FeOOH yellow pigments is carried out in the presence of compounds of the elements B, Al, Ga, Si, Ge, Sn or Pb in quantities of 0.05 to 10% by weight, expressed as 3- or 4-valent oxides and based on the α-FeOOH precipitated during nucleation, and an iron oxide yellow pigment is grown on the yellow nucleus, characterized in that growth is carried out to a multiplication factor (MF) of 2.5 to 7 and preferably 4 to 6 first by the precipitation process and then by the Penniman process.

BRIEF DESCRIPTION OF THE DRAWING OF FIG. 1

FIG. 1 represents the lightness values (ΔL*) and the saturation values (ΔL*) of the products produced in the Examples B1-B4, comparison examples V1-V2, and a commercial product of Bayer AG, Bayferrox ® 920 (H1-H2).

The process according to the invention is preferably carried out in such a way that 10 to 100 g/l FeOOH and preferably 30 to 80 g/l FeOOH obtained by the precipitation process are present at the beginning of the Penniman process. Particularly good results are obtained when the concentration of FeSO$_4$ during growth in the Penniman process is from 10 to 80 g/l FeSO$_4$ and preferably from 20 to 60 g/l.

The reduction obtainable in the salt load is dependent upon the multiplication factor at which the Penniman process begins. As can be seen from the following Examples, negative characteristics are present throughout for the reduction in salt load and thus illustrate the effect of combining the precipitation and Penniman processes.

Particularly good coloristic results are obtained when, on completion of the Penniman process, the reaction suspension is stirred for 0.5 to 20 h and preferably for 1 to 10 h at the reaction temperature without gassing.

In the following Examples and in FIG. 1, the lightness ΔL* and saturation ΔC* of the products of the Examples (B 1, B 2, B 3, B 4), the Comparison Example (V 1) and the commercial products of Bayer AG, Bayferrox ® 920 (H 1) and AC 5075 (H 2), are shown as delta values against a product in which a nucleus according to DE-A 3 326 632 was grown to the pigment by the Penniman-Zoph process (V 2) without further pigment growth by the precipitation process.

The colors of all samples are determined in Alkydal F 48, a product of Bayer AG, a medium-oil alkyd resin, at a pigment volume concentration of 10% in accordance with DIN 6174 (equivalent to ISO DIN 7724, 1-3 drafts). Positive values for ΔL*, lightness, and ΔC*, saturation, signify a coloristic improvement of the pigment.

The oil values were determined in accordance with DIN 53 199.

The following Examples are intended to illustrate the invention without limiting it in any way.

EXAMPLE 1

Nucleation and pigment growth by the precipitation process, in this case to a multiplication factor of 5.5, were carried out in accordance with DE-A 3 716 300, Example 4. 62.0 m$^3$ technical FeSO$_4$ solution (c=201.0 g FeSO$_4$/l) and 2215 l technical Al$_2$(SO$_4$)$_3$ solution (c=1.00 mol/l) were heated with stirring to 30° C. After heating, 9.40 m$^3$ technical sodium hydroxide (c=9.50 mol/l) were pumped in and, while the temperature was increased to 45° C., the mixture was oxidized while stirring with 700 m$^3$ air/h until the pH value measured ≦3.8.

80 m$^3$ water were added to 36.0 m$^3$ of this yellow nucleus suspension, followed by heating to 75° C. After heating, the pH value fell to ≦3.0. 26.0 m$^3$ technical sodium hydroxide (c=5.00 mol/l) and 37.0 m$^3$ technical FeSO$_4$ solution (c=201.0 g FeSO$_4$/l) were then added over a period of about 16 hours at 75° C. with stirring and gassing (700 m$^3$ air/h) so that the pH value of the suspension increased by 0.1 to 0.2 units per hour to pH 3.8 and then remained constant at 4.0±0.2.

During growth of the pigment, samples were taken after the nucleus had multiplied by 1.9 (Comparison Example 2), 2.8 (Example 3), 4.1 (Example 2) and 5.5 (Example 1) and were grown by the Penniman process.

To this end, a 6 liter stainless-steel vessel is filled with scrap iron (90 g/l), the FeOOH suspension (77 g/l) and iron(II) sulfate (40 g/l). After heating at 85.C, the contents of the vessel are gassed with air (600 l/h). The nucleus is multiplied from 5.5 to 11.7. The pigment filtered by standard laboratory methods and then washed until free from salt is subsequently dried at 120° C. in a recirculating air drying cabinet. Coloristic comparison with the product obtained when the nucleus was not grown beforehand by the precipitation process, Comparison Example 2, clearly shows that considerably lighter and more saturated pigments are formed.

Color values after pigment growth to MF 11.7 by a combination of the precipitation and Penniman processes, Penniman process beyond MF 5.5 by comparison with pigment growth beyond MF 1:

|  | ΔL* | Δa* | Δb* | ΔC* | Δh |
|---|---|---|---|---|---|
| Delta B 1 to V 1 | +3.8 | −1.2 | +3.2 | +3.2 | +2.5 |

The positive figures for lightness ΔL* and saturation ΔC* illustrate the improvement.

The pigment has an oil value of 37 g oil per 100 g pigment. The figure for the reduction in salt load is −2.7.

EXAMPLE 2

Pigment growth and working up are carried out as in Example 1.

The pigment grown to a multiplication factor (MF) of 4.1 by the precipitation process was used with 58 g/l FeOOH in the Penniman process. In this case, too, a distinct coloristic improvement is obtained. Color values after pigment growth to MF 12.1 by a combination of the precipitation and Penniman processes (delta MF 4.12 against MF 1):

|  | ΔL* | Δa* | Δb* | ΔC* | Δh |
|---|---|---|---|---|---|
| Delta B 2 to V 2 | +2.2 | −0.7 | +2.9 | +2.8 | +1.8 |

The positive values for lightness ΔL* and saturation ΔC* illustrate the improvement.

The pigment has an oil value of 37 g oil per 100 g pigment. The figure for the reduction in salt load is −3.8.

EXAMPLE 3

Pigment growth and working up were carried out as in Example 1. The pigment was grown by the precipitation process to a multiplication factor of 2.8, i.e. 39 g/l FeOOH were used in the Penniman process. Color values after pigment growth to MF 11.7 (delta MF 2.8 against MF 1):

|  | ΔL* | Δa* | Δb* | ΔC* | Δh |
|---|---|---|---|---|---|
| Delta B 3 to V 2 | +1.7 | −0.9 | +1.5 | +1.2 | +1.6 |

The positive values for lightness ΔL* and saturation ΔC* illustrate the improvement.

The pigment has an oil value of 36 g oil per 100 g pigment. The figure for the reduction in salt load is −4.3.

COMPARISON EXAMPLE 1

Pigment growth and working up were carried out as in Example 1. However, growth by the precipitation process was only continued to a multiplication factor of 1.9, i.e. 26 g/l FeOOH were used in the following Penniman process.

There is almost no improvement over the nucleus not multiplied by the precipitation process. Color values after pigment growth to MF 12.1 by a combination of the precipitation and Penniman processes (delta MF 1.9 against MF 1):

|  | ΔL* | Δa* | Δb* | ΔC* | Δh |
|---|---|---|---|---|---|
| Delta V 1 to V 2 | +0.1 | −0.3 | +0.3 | +0.2 | +0.5 |

The pigment has an oil value of 42 g oil per 100 g pigment. The figure for the reduction in salt load is −5.0.

COMPARISON EXAMPLE 2

Pigment growth and working up were carried out by the Penniman process as described in Example 1, except that 14 g/l FeOOH of the nucleus suspension described in Example 1 were used.

The color values after pigment growth to MF 11.8 by the Penniman process are used as reference for the Examples and the Comparion Example. Accordingly, all delta values are zero. The coloristic comparison of V 2 with the commercial product of Bayer AG, AC 5075, with its high negative values for lightness ΔL* and saturation ΔC* shows the need for the combined procedure.

|  | ΔL* | Δa* | Δb* | ΔC* | Δh |
|---|---|---|---|---|---|
| Delta AC 5075 to V 2 | −2.5 | +0.9 | −3.0 | −2.7 | −2.0 |

The pigment has an oil value of 45 g oil per 100 g pigment. The figure for the reduction in salt load is −5.4.

EXAMPLE 4

A spherolithic pigment (DE-A 3 326 632) produced by the precipitation process and grown to a multiplication factor of 5.2 as described in Example 1 was introduced into a 100 m$^3$ vat filled with 10 t scrap iron. For subsequent growth by the Penniman process, iron(II) sulfate (45 g/l), spherolithic FeOOH (50.4 g/l) and the scrap iron were gassed at 85° C. with 300 m$^3$/h air. Pigment growth is followed by working up as in Example 1. Color values after pigment growth to MF 10.1 by a combination of the precipitation and Penniman processes:

|  | ΔL* | Δa* | Δb* | ΔC* | Δh |
|---|---|---|---|---|---|
| Delta B 4 to V 2 | +2.6 | −0.8 | +3.2 | +2.9 | +2.2 |

As shown in Examples 1 to 3 and Comparison Example 1, the color can only be obtained by the combined process.

The pigment has an oil value of 33 g oil per 100 g pigment. The figure for the reduction in salt load is −0.8.

EXAMPLE 5

70 m$^3$ suspension consisting of 45 g/l FeSO$_4$ and 70 g/l spherolithic FeOOH were introduced into a 100 m$^3$ reactor filled with 10 t scrap iron (C=0.12%). The spherolithic FeOOH had been produced in accordance with DE-A 3 716 300, Example 4. 62.0 m$^3$ technical FeSO$_4$ solution (c=201.0 g FeSO$_4$/l) and 2215 l technical Al$_2$(SO$_4$)$_3$ solution (c=1.00 mol/l) were heated with stirring to 30° C. After heating, 9.4 m$^3$ technical sodium hydroxide (c=9.5 mol/l) were pumped in and, as the temperature was increased to 45° C., the mixture was oxidized while stirring with 700 m$^3$ air/h until the pH value was ≦3.8. 80.0 m$^3$ water were added to 36.0 m$^3$ of this yellow nucleus suspension which was then heated to 75° C. After heating, the pH value fell to ≦3.0. 26.0 m$^3$ technical sodium hydroxide (c=5.00 mol/l) and 37.0 $^3$ technical FeSO$_4$ solution (c=201.0 g FeSO$_4$ /l) were then added over a period of about 16 hours at 75° C. with stirring and gassing (700 m$^3$ air/h) so that the pH value in the suspension increased by 0.1 to 0.2 units per hour to pH 3.8 and then remained constant at 4.0±0.2. For this test, the yellow nucleus suspension was only multiplied by a factor of 5.2 and then used in the Penniman process.

Pigment growth took place in the Penniman suspension over a period of 24 h at 85° C., the suspension being gassed with 700 m$^3$ air/h. The suspension was stirred for 16 hours without gassing. Samples taken after 8 and 16 hours show the coloristic improvement in the pigments.

| Sample | g/l-FeSO$_4$ of the solution | % FeO in the pigment | ΔL* | Δa* | Δb* | ΔC* |
|---|---|---|---|---|---|---|
| Without stirring | 37 | 0.26 | 0 | 0 | 0 | 0 |
| After 3 h | 42 | 0.04 | 0.3 | 0.3 | 0.5 | 0.6 |
| After 6 h | 48 | 0.03 | 0.7 | −0.1 | 0.7 | 0.7 |

What is claimed is:

1. An improved three-step process for the production of low-silking iron oxide yellow pigments in which 1) nucleation of acicular α-FeOOH yellow pigments is carried out in the presence of compounds of the elements B, Al, Ga, Si, Ge, Sn or Pb in quantities of 0.05 to 10% by weight, expressed as 3- or 4- valent oxides and based on the α-FeOOH precipitated during nucleation, 2) an iron oxide yellow pigments is grown on the yellow nucleus by precipitation to achieve a multiplication factor of 2.5 to 7, and 3 )carrying out pigment growth by the Penniman process.

2. The process as claimed in claim 1 wherein 10 to 100 g/l of FeOOH obtained by the precipitation process are present at the beginning of the Penniman process.

3. The process as claimed in claim 2 wherein 30 to 80 g/l or FeOOH are present.

4. The process as claimed in claim 1 wherein the concentration of FeSO$_4$ during growth by the Penniman process is from 10 to 80 g/l.

5. The process as claimed in claim 4 wherein said concentration of FeSO$_4$ is 20 to 60 g/l.

6. The process as claimed in claim 1 comprising the further step of stirring the reaction suspension on completion of the Penniman process for 0.5 to 20 h at the reaction temperature without gassing.

7. The process as claimed in claim 6 wherein said stirring is carried out for 1 to 10 h.

* * * * *